(12) United States Patent
Siddiqui et al.

(10) Patent No.: US 7,428,216 B2
(45) Date of Patent: Sep. 23, 2008

(54) METHOD AND APPARATUS FOR POLICY AND ADMISSION CONTROL IN PACKET-BASED COMMUNICATION SYSTEMS

(75) Inventors: Anwar A. Siddiqui, New York, NY (US); Luke A. Tucker, Beacon Hill (AU)

(73) Assignee: Avaya Inc., Basking Ridge, NJ (US)

( * ) Notice: Subject to any disclaimer, the term of this patent is extended or adjusted under 35 U.S.C. 154(b) by 1014 days.

(21) Appl. No.: 10/261,432

(22) Filed: Sep. 30, 2002

(65) Prior Publication Data
US 2003/0133459 A1 Jul. 17, 2003

Related U.S. Application Data

(60) Provisional application No. 60/348,948, filed on Jan. 15, 2002.

(51) Int. Cl.
*H04L 12/26* (2006.01)
(52) U.S. Cl. .................. 370/230.1; 370/230; 709/227; 709/231
(58) Field of Classification Search .............. None
See application file for complete search history.

(56) References Cited

U.S. PATENT DOCUMENTS

| | | | |
|---|---|---|---|
| 6,631,122 B1 * | 10/2003 | Arunachalam et al. ...... | 370/332 |
| 6,738,819 B1 * | 5/2004 | Li et al. ..................... | 709/229 |
| 6,763,392 B1 * | 7/2004 | del Val et al. ............... | 709/231 |
| 6,804,738 B2 * | 10/2004 | Weber ......................... | 710/244 |
| 6,973,033 B1 * | 12/2005 | Chiu et al. ............... | 370/230.1 |
| 2002/0087699 A1 * | 7/2002 | Karagiannis et al. ........ | 709/227 |
| 2002/0194362 A1 * | 12/2002 | Rawlins et al. .............. | 709/235 |
| 2004/0022191 A1 * | 2/2004 | Bernet et al. ................ | 370/230 |

OTHER PUBLICATIONS

B.E. Carpenter et al., "Differentiated Services in the Internet," Proceedings of the IEEE, vol. 90, No. 9, pp. 1479-1494, Sep. 2002.

(Continued)

*Primary Examiner*—Gregory B Sefcheck
*Assistant Examiner*—Michael J Moore, Jr.
(74) *Attorney, Agent, or Firm*—Ryan, Mason & Lewis, LLP

(57) ABSTRACT

Techniques are disclosed for establishing packet-based communication between first and second endpoints over a network, in a manner which reduces the latency and complexity associated with call setup. In accordance with one aspect of the invention, a resource is requested from the network utilizing a first protocol, and while the request is pending, transmission of packets at a first priority level is commenced. After a response is received from the network granting access to the requested resource, a tagging mechanism is utilized to identify particular packets for transmission at a second priority level higher than the first priority level. In an illustrative embodiment, the first protocol is the Resource Reservation Protocol (RSVP), the first priority level corresponds to a Better than Best Effort (BBE) policy, and the second, higher priority level corresponds to an Expedited Forwarding (EF) policy. These policy levels may be implemented for a given packet by setting a Type of Service (TOS) byte in a header of the given packet to a value specifying the corresponding policy.

17 Claims, 7 Drawing Sheets

OTHER PUBLICATIONS

Bur Goode, "Voice Over Internet Protocol (VoIP)," Proceedings of the IEEE, vol. 90, No. 9, pp. 1495-1517, Sep. 2002.
R. Braden et al., "Resource ReSerVation Protocol (RSVP)—Version 1 Functional Specification," 2 pages, Sep. 1997.
S. Blake et al., "An Architecture for Differentiated Services," p. 1-30, Dec. 1998.
P. Almquist, "Type of Service in the Internet Protocol Suite," pp. 1-24, Jul. 1992.

* cited by examiner

FIG. 4

| TRAFFIC TYPE | DSCP ENTRY (6 BIT) | | TOS OCTET (8 BIT) (IP HEADER) | | | COMMENTS |
| --- | --- | --- | --- | --- | --- | --- |
| | DEC | BINARY | HEX | DEC | BINARY | |
| TOS BYTE SETTINGS FOR DIFFSERV ENABLED ROUTERS | | | | | | |
| VOIP WITH SUCCESSFUL RSVP | 46 | 101110 | B8 | 184 | 10111000 | TOS FOR EXPEDITED FORWARDING (DIFFSERV STANDARD BASED CODE POINT) |
| VOIP WITH UNSUCCESSFUL RSVP | 43 | 101011 | AC | 172 | 10101100 | TOS FOR BETTER THAN BEST EFFORT (BBE) (PROPRIETARY CODE POINT DEFINED FOR BBE TRAFFIC) |
| SIGNALING | 34 | 100000 | 80 | 128 | 10000000 | TOS FOR ASSURED FORWARDING (AF41) |
| TOS BYTE SETTINGS FOR IP PRECEDENCE COMPLIANT ROUTERS | | | | | | |
| VOIP WITH SUCCESSFUL RSVP | 44 | 101100 | B0 | 176 | 10110000 | IP PRECEDENCE/TOS |
| VOIP WITH UNSUCCESSFUL RSVP | 43 | 101011 | AC | 172 | 10101100 | TOS FOR BETTER THAN BEST EFFORT (BBE) (PROPRIETARY CODE POINT DEFINED FOR BBE TRAFFIC) |
| SIGNALING | 41 | 101001 | A4 | 164 | 10100100 | IP PRECEDENCE/TOS |

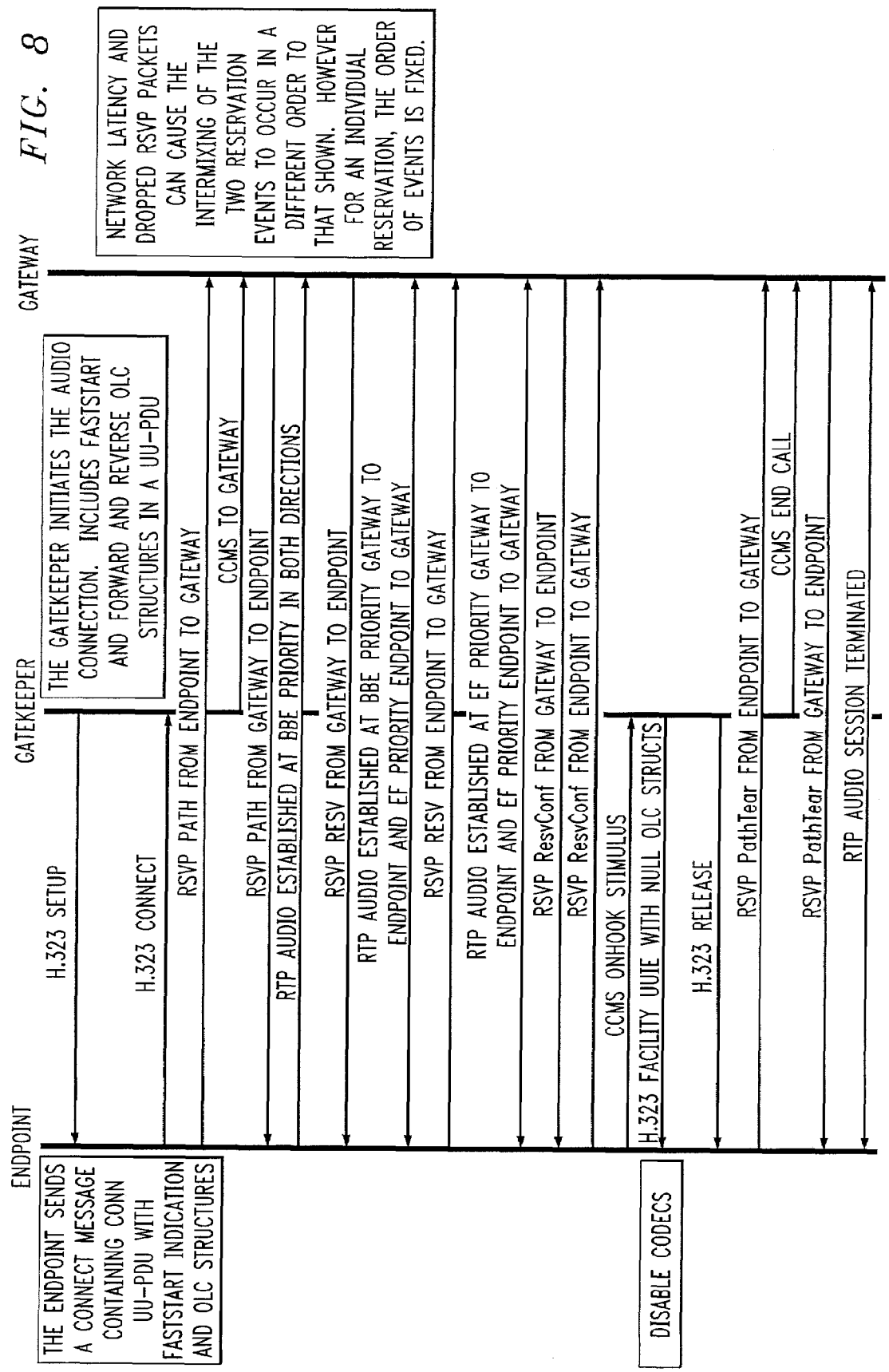

METHOD AND APPARATUS FOR POLICY AND ADMISSION CONTROL IN PACKET-BASED COMMUNICATION SYSTEMS

RELATED APPLICATION(S)

The present application claims the priority of U.S. Provisional Application Ser. No. 60/348,948 filed Jan. 15, 2002 and entitled "RSVP, DiffServ and Better than Best Effort (BBE) signaling at the network edge that performs VoIP Policy and Admission Control to guarantee Quality of Service (QoS)," which is incorporated by reference herein.

FIELD OF THE INVENTION

The present invention relates generally to packet-based communication systems suitable for transmitting voice or other information, and more particularly to call processing techniques for providing a desired Quality of Service (QoS) for packet-based communications in such systems.

BACKGROUND OF THE INVENTION

Internet traffic is typically handled by default in accordance with a so-called Best Effort (BE) policy. This has not been a problem with traditional data applications such as Hyper Text Transfer Protocol (HTTP), File Transfer Protocol (FTP) and Network Virtual Terminal Protocol (TELNET), as these applications do not place limits on traffic delay and jitter, although a long wait for an HTTP get request or an FTP download would annoy a user. However, many real-time applications require better QoS assurances than the default BE to allow them to perform as required. Voice over Internet Protocol (VoIP) is a good example of traffic that must be protected as it traverses the Internet. Resource Reservation Protocol (RSVP) is a protocol that allows the QoS needs of real-time applications to be signaled to network nodes that are traversed from the sender to the receiver. RSVP is described in greater detail in, for example, RSVP Version 1 Functional Specification, Internet Engineering Task Force (IETF) Network Working Group, Request for Comments (RFC) 2205, September 1997, which is incorporated by reference herein. RSVP establishes a reservation state known as soft-state in the network nodes. The sender sends RSVP PATH messages to the receiver and if the request is acceptable, the receiver responds with the soft-state reservation request back to the sender.

The need to send RSVP messages from sender to receiver and back again results in latency in the establishment of QoS. Latency associated with call setup and the establishment of QoS is unavoidable, but should also be minimized whenever possible. Other protocols, such as Session Initiation Protocol (SIP) and ITU H.323, also have an associated call setup latency in terms of a round trip time for establishing the call. In a fast or gigabit Ethernet network this latency is small, but on larger networks containing Wide Area Network (WAN) links this latency can increase significantly. Coupling of QoS signaling to call setup signaling therefore increases call setup latency. More specifically, the round trip times associated with SIP or H.323 added to the round trip time for RSVP QoS reservation unduly increases overall call setup time.

The coupling of call setup with QoS signaling also complicates the call setup mechanism. It is generally necessary to interrupt the call setup at a suitable point to perform the QoS signaling, after which call setup is resumed. Prior to resuming call setup the RSVP QoS setup status must be examined. If the status indicates QoS setup success, call setup should simply complete, but if the status indicates QoS setup failure, then the call setup must terminate gracefully. This may require feeding the error condition back to a call controller, or other similar call processing element of the system, that must then initiate a suitable action. The action could be to terminate the call setup through releasing the call and playing a tone indicative of the QoS failure. Alternatively the call setup may be terminated and the call directed over a different route. Due to the additional failure conditions that RSVP signaling brings, the complexity of the entire call setup mechanism is increased. Therefore, a need exists for a technique which reduces the dependence of QoS signaling on call setup signaling.

SUMMARY OF THE INVENTION

The present invention provides improved techniques for policy and admission control for VoIP and other types of packet-based communications over a network. Advantageously, the techniques of the invention reduce the dependence of QoS signaling on call setup signaling, thereby reducing the latency and complexity associated with call setup.

In accordance with one aspect of the invention, packet-based communication is established between first and second endpoints over a network by first requesting a resource from the network utilizing a first protocol, such as RSVP. While the request is pending, transmission of packets at a first priority level is commenced, e.g., by setting a Type of Service (TOS) byte in the packet headers to a value indicating a Better than Best Effort (BBE) policy. After a response is received from the network granting access to the requested resource, a tagging mechanism such as the Differentiated Service (DiffServ) protocol is utilized to identify particular packets for transmission at a second priority level higher than the first priority level. This second priority level may correspond to an Expedited Forwarding (EF) priority, and may be specified by setting the TOS byte in the packet headers to a corresponding value.

BRIEF DESCRIPTION OF THE DRAWINGS

FIG. 4 shows example Type of Service (TOS) byte headings for Differentiated Service (DiffServ) enabled routers and IP Precedence compliant routers in accordance with the invention.

FIG. 8 illustrates an example point-to-point call setup process implementable in the FIG. 1 system in accordance with the invention.

DETAILED DESCRIPTION OF THE INVENTION

The present invention will be illustrated below in conjunction with an exemplary VoIP communication system configured to support Internet telephony applications. It should be understood, however, that the disclosed techniques are suitable for use with a wide variety of other types of packet-based systems including, for example, Asynchronous Transfer Mode (ATM) and Frame Relay systems. Also, the invention is not limited to use with any particular type of communication system or configuration of system elements. Those skilled in the art will recognize that the disclosed techniques may be used in any communication application in which it is desirable to provide Quality of Service (QoS) guarantees for Internet protocol (IP) communications or other similar types of packet-based communications over a network.

The term "packet" as used herein is intended to include not only IP packets but also other types of packets used in other packet-based communication systems.

The term "voice" is used herein is intended to include speech and other human-generated audio information, machine-generated audio information or combinations of these and other types of audio information. It should be noted that the invention is generally applicable to any type of audio information. The invention can also be applied to other types of signals, including facsimile signals, signaling tones, etc.

The term "call" as used herein is intended to be construed broadly so as to encompass Internet telephony communications, VoIP communications, session initiation protocol (SIP) communications, data transmissions, e-mail, facsimile, messaging, chat sessions, etc.

The term "endpoint" as used herein is intended to include an origination or destination device associated with a given VoIP call or other packet-based communication.

Figure 1:
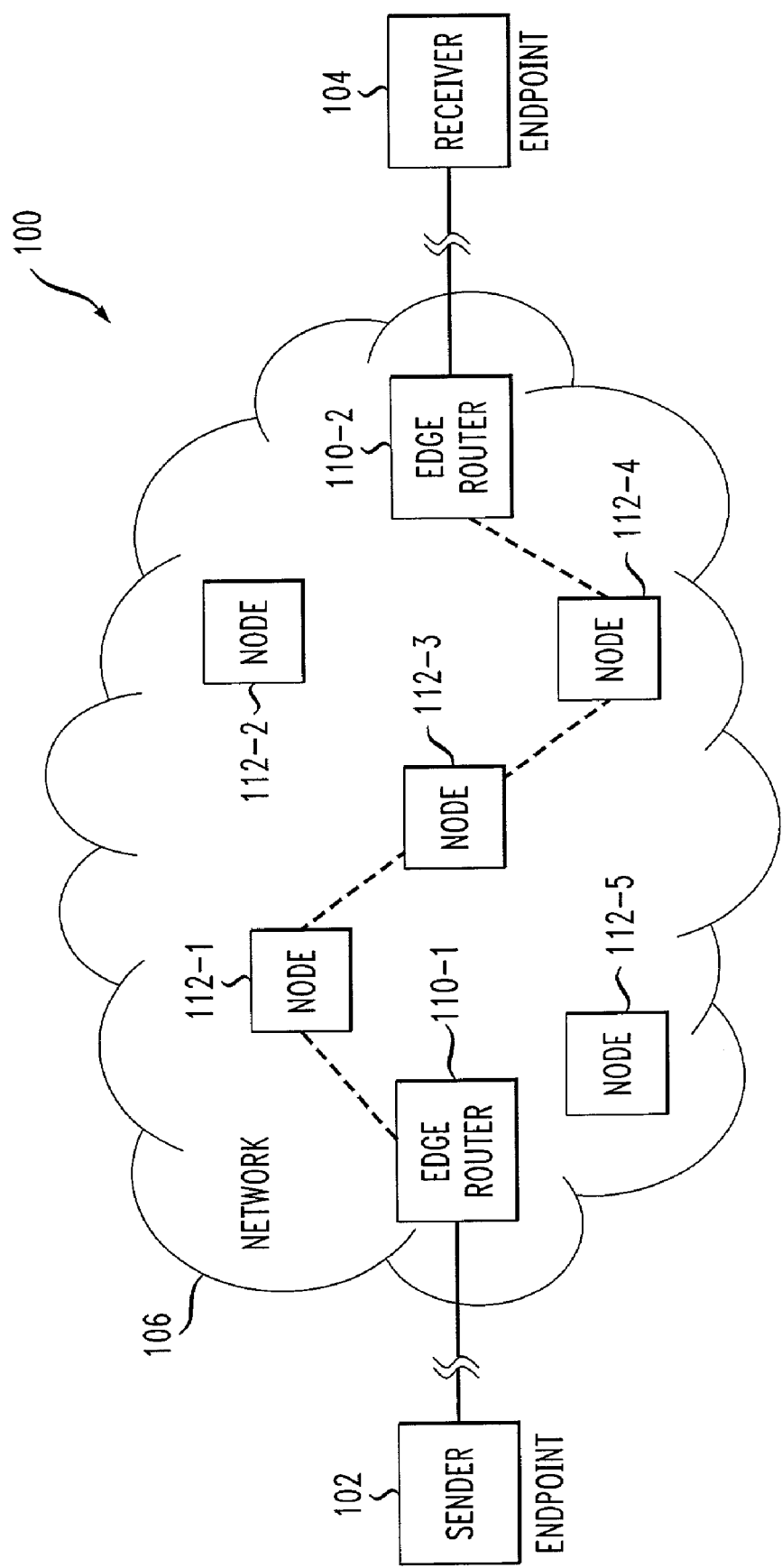
FIG. 1 shows an exemplary VoIP communication system in which the invention is implemented.

FIG. 1 shows a packet-based VoIP communication system 100 in which the present invention is implemented. The system 100 may also be referred to herein as an Internet telephony system. The system 100 includes a sender endpoint 102 and a receiver endpoint 104, each coupled to a network 106. The network 106 illustratively includes an "edge" portion comprising edge routers 110-1 and 110-2 coupled to sender endpoint 102 and receiver endpoint 104, respectively, as well as a "core" portion comprising network nodes 112-1, 112-2, 112-3, 112-4 and 112-5. The nodes 112 may comprise routers, gateways, switches or other packet processing elements, or portions or combinations of such elements. Of course, the particular number and arrangement of edge routers and core nodes shown is by way of illustrative example only, and the network 106 need not have any specific configuration of such elements.

The endpoints 102 and 104 may be may be conventional wired or wireless telephones, personal computers (PCs), personal digital assistants (PDAs) or other types of voice signal processing devices. It is assumed without limitation for purposes of the illustrative embodiment that the sender endpoint 102 and the receiver endpoint 104 comprise respective IP transmitter and IP receiver circuitry, configured in a well-known conventional manner. For example, the sender endpoint 102 may be configured for generating an analog voice signal and converting the voice signal into an appropriate digital format suitable for processing into packets for transmission over the network 106 to the receiver endpoint 104. Similarly, the receiver endpoint 104 may be configured to receive packets containing the digital voice signal from the network 106 and to generate a corresponding reconstructed analog voice signal.

Moreover, it should be noted that endpoints 102 and 104 are each typically configured to operate as both receiver and transmitter, as in the case of a bidirectional VoIP communication established between the two endpoints. The identification of one of the endpoints as sender and the other as receiver is therefore by way of illustrative example only, to facilitate subsequent description of the VoIP techniques of the invention. Moreover, VoIP communications may be established between endpoints which do not necessarily correspond to terminal devices of the system 100. For example, such communications may be established between one of the endpoints 102, 104 and a core node 112 of system 100. In the latter configuration, the core node 112 may be considered to be an "endpoint" as that term is used herein.

Additional system elements, not shown in the figure, may be coupled between each of the endpoints 102, 104 and its corresponding edge router 110.

Network 106 may represent, e.g., a global communication network such as the Internet, a wide area network, a metropolitan area network, a local area network, a wireless cellular network, a public switched telephone network (PSTN), or a satellite network, as well as portions or combinations of these or other communication networks.

The edge routers 110-1 and 110-2 may be implemented as otherwise conventional IP routers, gateways, switches or other packet processing elements, modified to provide at least a portion of the VoIP processing operations described herein. For example, one or both of the edge routers may be implemented as part of or in conjunction with a DEFINITY® Enterprise Communication Service (ECS) communication system switch available from Avaya Inc. of Basking Ridge, N.J., USA. Another example switch suitable for use in conjunction with the present invention is the MultiVantage™ communication system switch, also available from Avaya Inc.

Conventional aspects of VoIP techniques implementable in the system 100 are described in, for example, International Telecommunication Union—Telecommunication Standardization Sector (ITU-T) Recommendation H.323, "Packet-based multimedia communication systems," November 2000, and ITU-T Recommendation H.225, "Call signaling protocols and media stream packetization for packet-based multimedia communication systems," November 2000, both of which are incorporated by reference herein.

As is described in greater detail in the above-cited H.323 document, an IP endpoint, such as a PC, IP telephone or other communication terminal of an Internet telephony system, communicates with a "gatekeeper," which may be a communication system switch such as the above-noted ECS switch, or other packet processing element of the network 106.

It should be emphasized that the configuration of the edge routers, nodes and endpoints of the system 100 is for purposes of illustration only, and should not be construed as limiting the invention to any particular arrangement of elements. For example, the system 100 may include additional endpoints, and may utilize other types and arrangements of routing elements, switching elements or other types of processing elements.

Other example processing elements that may be configured to implement at least a portion of the techniques of the invention include without limitation IP telephones, media gateways, call controllers, etc.

Figure 2:
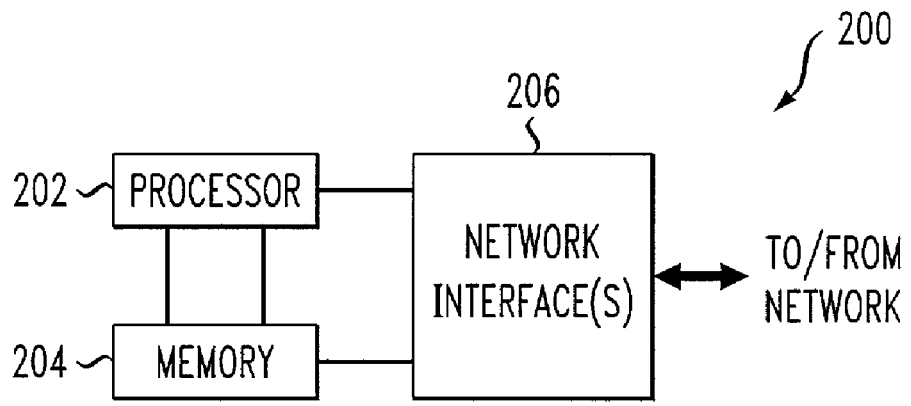
FIG. 2 is a block diagram showing an illustrative embodiment of a processing element of the FIG. 1 system.

FIG. 2 shows one possible implementation of a given processing element 200 of the FIG. 1 system. The processing element 200 may represent one of the endpoints 102 or 104, edge routers 110 or nodes 112 of the FIG. 1 system, and includes a processor 202 coupled to a memory 204 and one or more network interfaces 206. The packet-based communication techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as combinations thereof.

Those skilled in the art will recognize that the individual elements of FIG. 2 as shown for illustrative purposes may be combined into or distributed across one or more processing devices, e.g., a microprocessor, an application-specific integrated circuit (ASIC), a computer or other device(s).

Figure 3:
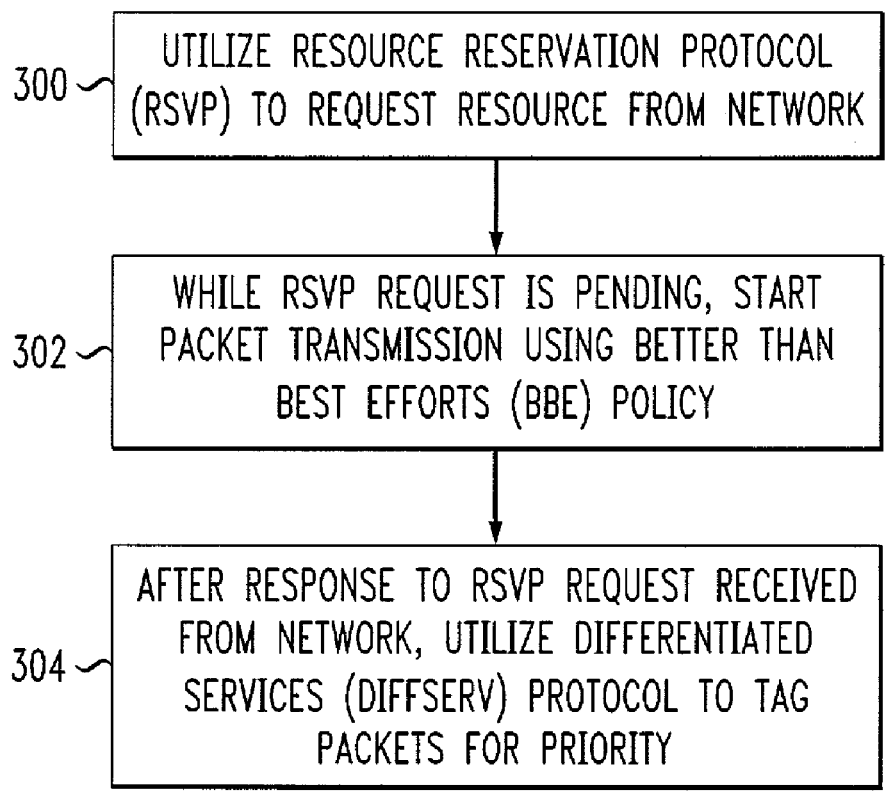
FIG. 3 is a flow diagram illustrating an example process implementable in the FIG. 1 system in accordance with the invention.

FIG. 3 is a flow diagram of an example process in accordance with the invention for establishing packet-based communication between at least the sender endpoint 102 and the receiver endpoint 104 over the network 106. The process as shown includes steps 300, 302 and 304. It is assumed without limitation that at least a portion of the process is implemented in the edge router 110-1 coupled to the sender endpoint 102.

In step 300, a resource reservation protocol such as RSVP is utilized to request a resource from the network. The requested resource may be, for example, a particular bandwidth allocation, throughput delay guarantee, or other network resource required in order to provide a particular QoS for transmission of packets from sender endpoint 102 to receiver endpoint 104 over network 106. This RSVP request may be implemented in a conventional manner, as defined in the above-cited RSVP functional specification.

While the RSVP request is pending, transmission of packets is commenced in accordance with a Better than Best Effort (BBE) policy, as indicated in step 302. Other policies can also be used in step 302, such as the previously mentioned default BE policy.

After a response is received from the network granting access to the requested resource, a tagging mechanism is utilized to identify particular packets for priority transmission, as shown in step 304.

The tagging mechanism is preferably implemented using a Differentiated Services (Diffserv) protocol, as described in, for example, Architecture for Differentiated Services, IETF Network Working Group, RFC 2475, December 1998, which is incorporated by reference herein. Other tagging mechanisms can also be used, such as the IP Precedence protocol described in, for example, Type of Service in the Internet Protocol Suite, IETF Network Working Group, RFC 1349, July 1992, which is incorporated by reference herein.

More detailed examples of the general process illustrated in FIG. 3 will be described below in conjunction with FIGS. 4 through 8.

It should be noted that the present invention is particularly well-suited for use in policy and admission control for real-time multimedia applications that require application-controlled QoS, but can also be used in a wide variety of other contexts.

Advantageously, the invention in the illustrative embodiment of FIG. 3 reduces call setup latency and complexity. More particularly, in the illustrative embodiment, the latency and complexity is significantly reduced while using RSVP and at the same time a mapping to DiffServ is established to allow scalability issues to be resolved.

The combination of DiffServ and BBE marking at the network edge, and RSVP to signal for QoS over the network path, results in a QoS architecture that is scalable, and yet performs efficient policy and admission control. DiffServ allows the flows to be protected through adequate QoS in the absence of a valid reservation. This may be due to temporary conditions associated with call setup, or due to a node not supporting RSVP at all. Different code point markings that reflect different reservation states mean that the DiffServ protection is layered based upon existing traffic in the network.

The invention provides advantages over conventional QoS techniques such as DiffServ and IEEE 802.1p, each of which attempts to meet basic QOS needs in as simple a way as possible through prioritization of IP packets, but is deficient with regard to real-time applications such as VoIP. Relying solely on this type of prioritization can cause voice quality degradation for all calls traveling across failed or degraded links.

Additional details regarding IEEE 802.1p can be found in the associated standard document available from the Institute of Electrical and Electronics Engineers (IEEE), which is incorporated by reference herein.

When IP packets are prioritized through conventional marking with DiffServ Code Points (DSCPs), these packets are aggregated into flows also known as classes. An advantage of aggregating packet behavior in this way is that this makes the priority treatment of packets scalable. Many sub-flows or "microflows" contribute to a given DSCP which is treated across routers as a Per Hop Behavior (PHB). However, a disadvantage of this conventional approach is that individual microflows are lost and so guarantees cannot be enforced for a given flow originating from a particular sender and being sent to a particular receiver. This means that admission control cannot be enforced and also traffic shaping is carried out on the aggregated flow as opposed to on the microflow. If bandwidth and general network resources become limited, it is necessary to police access to the network in order to safeguard existing VoIP calls.

A flow of traffic (e.g., a burst of packets) being added into an aggregate flow could cause the aggregate flow to periodically exceed the allowable traffic profile, causing disruption to other traffic. This disruption typically takes the form of random dropping of packets. The source of the misbehaving traffic is not directly informed of the congestion it is causing. If the source is sending Transmission Control Protocol (TCP) packets and these get dropped, the result is that throttling of the data source occurs, but with User Datagram Protocol (UDP) no such throttling will happen and that will cause VoIP traffic (e.g., RTP over UDP/IP) to be lost, where RTP denotes Real-Time Transport Protocol.

An alternative approach involves a combination of RSVP and Integrated Services (IntServ) signaling, where IntServ is defined by the IETF. Requests for resource reservations are transmitted in accordance with RSVP to routers on the path between the sender and the receiver of a flow. IntServ defines the parameters that characterize the flow. Routers receive these flow specifiers and set up reservations for the traffic accordingly. As these flows are set up for specific parameters, these flows can be policed as they enter a router. Also, the flows can be shaped to meet the desired traffic profile as described in the IntServ parameters. Excess traffic, beyond the bounds of what was originally requested, can be dealt with by downgrading to BE service.

As noted previously, the present invention in accordance with one aspect thereof addresses the above-noted problems in a particularly efficient manner, using a combination of RSVP, DiffServ and BBE signaling as described in conjunction with FIG. 3. In addition, the illustrative embodiment of the invention as shown in FIG. 3, and as will be described in greater detail below with reference to FIGS. 4 through 8, generally provides improved performance relative to the above-described combination of RSVP and IntServ.

VoIP is an example of a real-time application that, once admitted into the network, requires a guarantee on QoS. Such QoS guarantees may need to be negotiated at Wide Area Network (WAN) interfaces to avoid congestion problems. In addition, an admission control mechanism is typically used to protect the calls admitted into the network from congestion caused by admitting new calls beyond what the network is capable of carrying. Such an admission control mechanism is preferably configured to provide protection of quality of an existing call under adverse conditions such as the well-known "snow day" or "cut line" scenarios.

The "snow day" scenario refers generally to a situation involving an unusual traffic pattern, typically with higher than normal traffic volumes, such as that which may result when large numbers of people deviate from their usual work or school routines due to a weather emergency.

The "cut line" scenario refers generally to a situation involving a failure of a network link or set of links.

In accordance with the invention, an RSVP-based policy and admission control technique can be used to mitigate the "snow day" scenario by always assigning lower priority DSCP values to new calls during initial set-up while pursuing an RSVP reservation. Once that reservation has been secured the packet marking may be upgraded to an Expedited Forwarding (EF) class. Such a mechanism ensures that during a "snow day" scenario the calls which were admitted earlier will continue to enjoy good QoS while the calls admitted later that exceed the network capacity achieve a lesser QoS.

Another advantage associated with the use of RSVP is that it can also mitigate the "cut line" scenario, as RSVP enabled routers react to route changes that affect reservations which are made within that router. When a route changes, RSVP PATH and RESV refresh messages establish PATH and RESV state, respectively, along the new route. The routers may initiate this action after a short period that allows the routing tables to be updated, preventing the newly established path from becoming immediately redundant in case routing changes are still being applied. It is desirable for the routers to do this because it is prudent to re-establish the new reservations as soon as possible after a link failure. If the endpoints were solely responsible for this action, the new reservations could be delayed by up to the refresh period of the path and reservation state as the endpoints are unaware of routing. Additional details can be found in Section 3.6 of the above-cited RSVP functional specification. It should be emphasized, however, that these router operations are optional, and not requirements of the invention.

In implementing the FIG. 3 process in the FIG. 1 system, RSVP is installed at the edge of the network, e.g., in the edge routers 110. Standard IntServ models may also be used, or they can be enhanced with newer services such as DCLASS, described in Format of the RSVP DCLASS Object, IETF Network Working Group, RFC 2996, November 2000, which is incorporated by reference herein. The edge routers are configured to perform VoIP policy control and admission control, also referred to herein as VoIP policy and admission control. These activities can be advantageously carried out at the network edge as the link bandwidths are much reduced. For example, a T1 link running Frame Relay operates at only 1.536 Mbit/s. Policing the traffic at the network edge ensures that a lower bandwidth link of this type is protected from applications that are abusing the volume of data they are attempting to send and the manner in which this data is being sent. This situation can come about, for example, through a problem associated with a host causing it to erroneously send too much data, or an application such as FTP that simply does not throttle back its data throughput, or it can be brought on maliciously by someone attempting a denial of service attack, or a user attempting to gain greater bandwidth allocation than he or she is entitled to.

It is therefore advantageous to configure RSVP at the network edge and to allow applications such as VoIP running on a VoIP endpoint to signal for QoS using RSVP. The endpoint issues a PATH request as normal and awaits the arrival of an RESV message indicating that the reservation has been properly established. Even though the edge router where RSVP is operational is performing microflow policing and shaping, it can only do this for relatively few flows over the lower bandwidth link, such that scalability is not an issue. The endpoint therefore establishes a reservation at the network edge using standard RSVP signaling.

RSVP messages pass transparently through the core of the network where DiffServ enabled routers are located. More particularly, the core nodes 112 of the network 106 are preferably implemented as DiffServ enabled routers in the illustrative embodiment. Therefore these core nodes are unaware of the QoS requests being made by the endpoint. Protecting the flow at the network core is done through associating the call with a DSCP. The DSCP reflects the type of flow that is being protected. For example, VoIP may be best protected through the EF class. The real-time nature of VoIP maps well into the EF behavior as defined in the above-cited DiffServ IETF document and so a reserved flow should also be associated with that DSCP. This means that the EF PHB generally must be configured in the network core. Since the core network does not use RSVP, the EF PHB is needed here.

In addition to providing DiffServ at the network core, DiffServ should also be configured at the network edge. This is done for two reasons. First, if a reservation is temporarily lost, possibly due to the flow being rerouted, then the flow is still protected in the interim by the so-marked packets being forwarded to a queue handling the PHB. In the temporary absence of RSVP, the flow is still protected. In the C-Hawk™ RSVP design from Avaya Inc. this PHB is referred to as the "Audio" class PHB and is carried out through EF DSCP marking of audio packets. Rerouting of this nature can be caused by a cut link or a problem with RSVP communications.

As noted previously, the use of DiffServ in the manner described above is not a requirement of the invention. Other protocols can be used, such as the IP Precedence protocol mentioned above, or other suitable mechanisms.

All VoIP packets, signaling and bearer, that are originated in VoIP endpoints are marked with Type of Service (TOS) bytes, in accordance with the techniques of the invention.

FIG. 4 shows examples of such TOS byte markings suitable for use in implementing the invention. The TOS byte settings are shown for two general categories, namely, DiffServ enabled routers and IP Precedence compliant routers. These routers correspond to edge routers 110 and nodes 112 in the FIG. 1 system. For each of the general categories, 6-bit DSCP entries and corresponding TOS octets are shown for three different traffic types, namely, VoIP with successful RSVP, VoIP with unsuccessful RSVP, and signaling. The DSCP entries are shown in decimal and binary formats, and the TOS octets in hexadecimal, decimal and binary format.

The BBE DSCP is referred to herein as a "proprietary" code point defined for BBE traffic. It is proprietary in the sense that it is a non-standard code point, unlike the EF DSCP, which is a standard DSCP in accordance with the DiffServ protocol.

Figure 5:
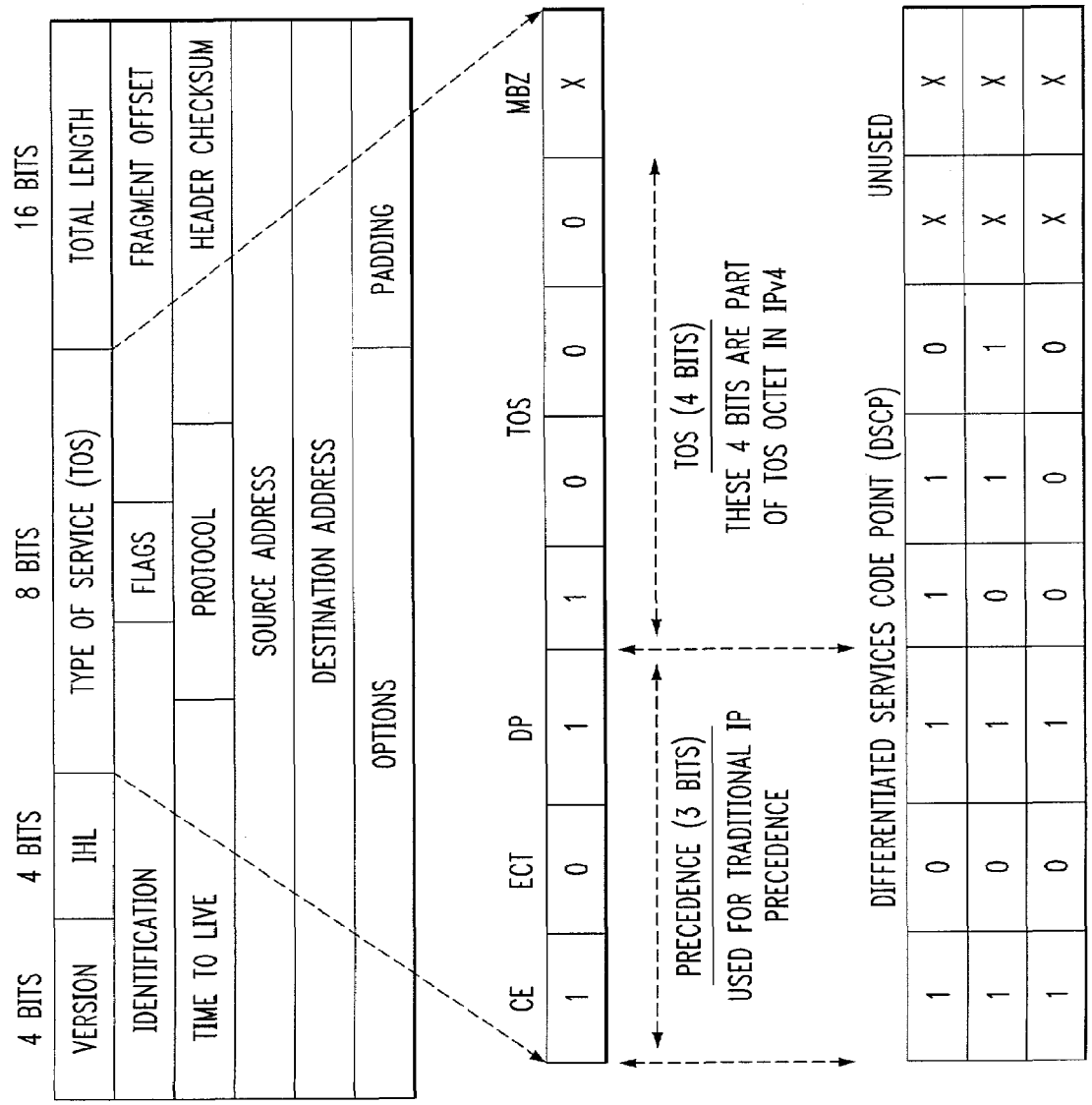
FIG. 5 illustrates the interpretation of an example IP header configuration in accordance with the invention.

FIG. 5 illustrates an example IP packet header, for IP version 4 (IPv4), indicating the placement of the TOS octet in the IPv4 header. The figure also shows the manner in which the TOS octet is interpreted by a DiffServ enabled router and an IP Precedence compliant router. In the DiffServ interpretation, the first 6 bits of the TOS octet specify a DSCP value for EF class, for a BBE class, and for an Assured Forwarding (AF41) class, as shown. The BBE class may be selected as the AF41 class. In the IP Precedence interpretation, the first 3 bits of the TOS octet are precedence bits used for traditional IP precedence as described in the above-cited IP Precedence IETF document.

It is to be appreciated that the use of IPv4 in the present description is by way of example only. The invention can be used with other versions of IP, such as IP version 6 (IPv6), and as previously noted with non-IP protocols as well.

Unsuccessful RSVP denotes a scenario in which a flow signaled for RSVP QoS and did not achieve the requested reservation, for example, due to insufficient bandwidth being available. In this case the flow can still be maintained, but at a lower precedence than the reserved flow that is marked with EF DSCP. This "second class" flow should still be marked as being superior to default BE data traffic as it still represents a real-time flow and so is referred to herein as a "Better than Best Effort" or BBE flow. The packets in the flow are marked with a DSCP marking that reflects a lower precedence PHB on the edge router than the EF flows. Also at the core of the network, the PHB can be configured to give lower precedence to this flow than to the EF flows. This does not have to be the case, for example, if the core is capable of handling both BBE and EF flows at the same precedence level.

Figure 6:
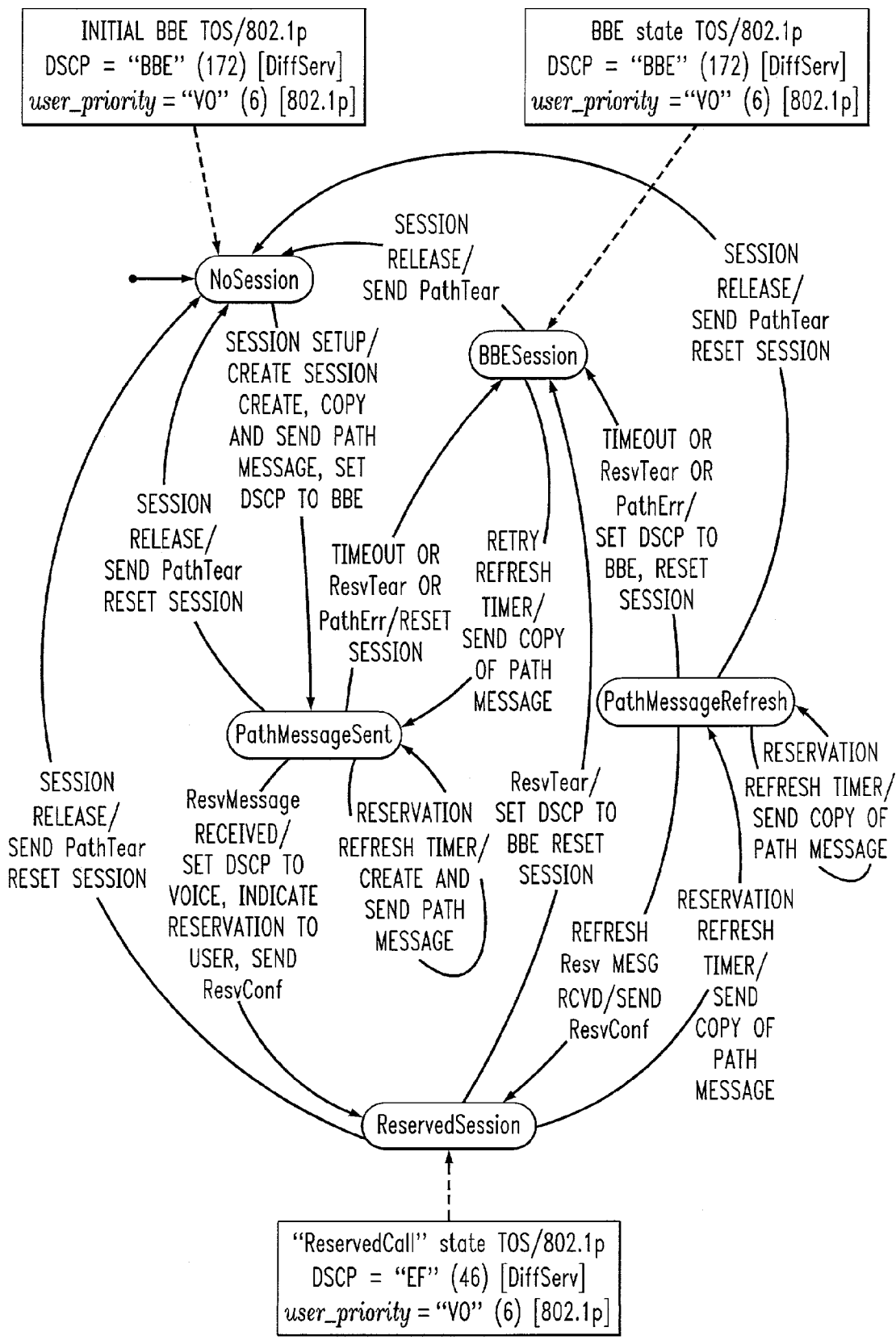
FIGS. 6 and 7 show state diagrams for the respective sender and receiver endpoints of the FIG. 1 system in an illustrative embodiment of the invention.
Figure 7:
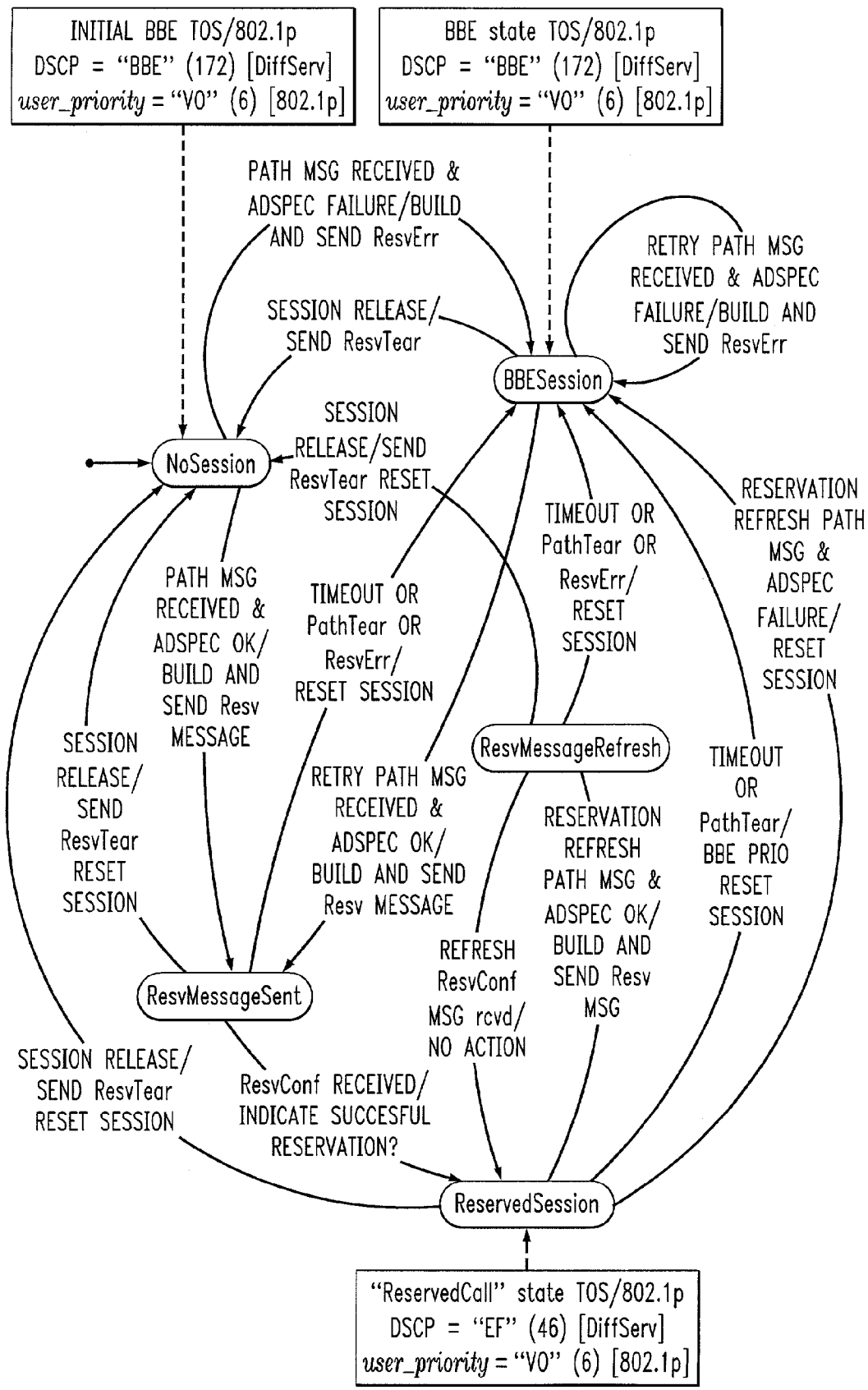

FIGS. 6 and 7 show state diagrams of the respective VoIP sender endpoint 102 and receiver endpoint 104 in the FIG. 1 system, with VoIP policy and admission control implemented using a combination of RSVP, DiffServ and BBE signaling as described above. In the state diagrams, events or actions are associated with sender and receiver state transitions. The FIG. 6 state diagram illustrates the RSVP session for the sender endpoint, and the FIG. 7 state diagram illustrates the RSVP session for the receiver endpoint. The receiver endpoint receives a PATH message, which allows it to then send a RESV message. Sending a RESV message is conditional upon the associated RSVP ADSPEC object passing scrutiny.

With reference to FIG. 6, the sender endpoint state diagram includes the states NoSession, PathMessageSent, BBESession, PathMessageRefresh and ReservedSession, and illustrates how the RSVP protocol progresses through these different states from NoSession to ReservedSession and ultimately back to NoSession.

Similarly, the receiver endpoint state diagram of FIG. 7 includes the states NoSession, ResvMessageSent, BBESession, ResvMessageRefresh and ReservedSession, and illustrates how the RSVP protocol progresses through these different states from NoSession to ReservedSession and ultimately back to NoSession.

The state diagrams generally start in the NoSession state, as indicated by the "•" symbol and an associated arrow adjacent this state in each of the figures.

In both FIGS. 6 and 7, the TOS and IEEE 802.1p settings are shown for the NoSession, BBESession and ReservedSession states, which are also referred to as Initial BBE, BBE and ReservedCall states, respectively. For each of these states, the user priority for 802.1p is VO or 6 decimal. In the Initial BBE and BBE states, the TOS byte setting for a DiffServ enabled router is 172 decimal, while in the ReservedCall state, the TOS byte setting for a DiffServ enabled router is 46 decimal denoting the EF class.

An important advantage associated with the use of BBE signaling in the illustrative embodiment described above is the capability to decouple SIP, H.323 or any other call processing protocol call setup from signaling for QoS over RSVP. From the start of call setup, various call setup states are entered reflecting what point the user has reached in the establishment of the call. At a certain point enough information is known to be able to attempt to establish an RSVP reservation at the edge router without having to wait for the call to complete. A PATH message is constructed and sent to the receiver endpoint, requesting bandwidth needs as defined by factors such as the particular codec being used and the packet size. This information must be known prior to making the request, but once known any additional delay simply adds to call setup latency.

In this way signaling for QoS is not totally decoupled from call setup signaling, but it does become so once the initial PATH message is sent. While waiting for the reservation to complete, the call setup might complete and an RTP audio channel may be established. As QoS signaling is not yet complete it is necessary to mark the initial RTP packets with the BBE DSCP, in accordance with the FIG. 3 process. By doing this existing reserved flows at the edge router will not be disturbed, even if the reservation has temporarily been lost due to the lower precedence of BBE as compared to EF. At the core of the network the as yet unreserved flow is still protected against default BE traffic. The same is true at the network edge.

As noted above, the RSVP reservation request may be successful or unsuccessful. If the reservation request is successful, the packet marking of the RTP packets is simply elevated to EF DSCP. However, an unsuccessful reservation results in the flow remaining at BBE level as it should not have any adverse effect on existing reserved flows.

QoS signaling within a call signaling context using the above-described techniques is therefore very simple to implement and does not increase call signaling complexity, resulting in a more stable implementation. This is highly desirable given the very complex nature of SIP and H.323 signaling.

FIG. 8 shows an example of a point-to-point call setup process, illustrating how the state transitions of FIGS. 6 and 7 fit into H.323 signaling carried out by exemplary VoIP endpoints. The diagram shows communications between an endpoint, a gatekeeper and a gateway. The endpoint, gatekeeper and gateway of FIG. 8 may be viewed in this example as corresponding to the sender endpoint 102, edge router 110-1 and receiver endpoint 104, respectively, of FIG. 1. The example thus shows call setup between the endpoint and the gateway via the gatekeeper.

The gatekeeper initiates the H.323 SETUP message. In this example, the gatekeeper uses the H.323 FastStart technique to minimize call setup time. In doing so, it passes OLC structures for the forward and reverse direction to the VoIP endpoint which then passes the completed OLC structures back to the gatekeeper with an H.323 CONNECT message. RSVP signaling starts after the CONNECT message is sent since the codecs, data rates and UDP ports are now known. This is sufficient information to initiate a PATH message to the gateway.

RSVP signaling then proceeds as shown in the diagram. At one point, the VoIP endpoint initiates an on-hook stimulus which translates into the call being hung up. The gatekeeper responds by disabling the codecs and tearing down RTP sessions with a Facility User to User Information Element (UUIE). A release complete message is sent to finalize the H.323 signaling. At this point the reservations are torn down in both directions through a Path Tear message from the endpoint to the gateway.

In the diagram, OLC refers to Optical Layer Control, UU-PDU refers to User to User Protocol Data Unit, and CCMS refers to Common Channel Message Set, a protocol used for transport of functions, such as button press, display control, lamp control, etc., to support IP terminals.

It should be noted that the H.323 call set process in the FIG. 8 example relates to a dual connect architecture. A similar arrangement can be used for a single connect architecture. In this case, the basic RSVP signaling typically will not change, even though message content and the particular messages used for H.323 single connect signaling will change in a manner that will be apparent to those skilled in the art.

As previously noted, one or more of the call processing functions described above in conjunction with the illustrative embodiments of the invention may be implemented in whole or in part in software utilizing processor 202 and memory 204. Other suitable arrangements of hardware, software or both may be used to implement the call processing functions of the invention.

It should again be emphasized the above-described embodiments are illustrative only. For example, alternative embodiments may utilize different endpoint, edge router and core network node configurations, different reservation protocols, and different techniques for tagging packets for prioritization. These and numerous other alternative embodiments within the scope of the following claims will be apparent to those skilled in the art.

What is claimed is:

1. In a communication system, a method for establishing packet-based communication between first and second endpoints over a network, the method comprising the steps of:
   requesting a resource from the network utilizing a first protocol;
   while the request is pending, commencing transmission of packets at a first priority level higher than a priority level of Best Effort (BE) traffic in the network; and
   after a response is received from the network granting access to the requested resource, utilizing a tagging mechanism to identify particular packets for transmission at a second priority level higher than the first priority level;
   wherein the first priority level is implemented for a first one of the packets by setting a designated portion of a header of the first packet to a value specifying a Better than Best Effort (BBE) policy; and
   wherein the second priority level is implemented for a second one of the packets by setting the designated portion of a header of the second packet to a value specifying an Expedited Forwarding (EF) policy;
   transition between use of the BBE policy and use of the EF policy thereby being conditioned on success or failure of the request for the resource, with a transition from use of the BBE policy to use of the EF policy occurring if the request is granted, and the policy in use otherwise remaining the BBE policy.

2. The method of claim 1 wherein the packet-based communication is established between the first and second endpoints via at least one edge router of the network.

3. The method of claim 1 wherein the first protocol comprises an RSVP protocol.

4. The method of claim 1 wherein the first priority level is implemented for the first packet by setting a Type of Service (TOS) byte in the header of the first packet to the value specifying the Better than Best Effort (BBE) policy.

5. The method of claim 1 wherein the value specifying the Better than Best Effort (BBE) policy comprises at least one of a specified Differentiated Services Code Point (DSCP) and a specified set of precedence bits.

6. The method of claim 1 wherein the second priority level is implemented for the second packet by setting a Type of Service (TOS) byte in the header of the second packet to the value specifying the Expedited Forwarding (EF) policy.

7. The method of claim 6 wherein the value specifying the Expedited Forwarding (EF) policy comprises at least one of a specified Differentiated Services Code Point (DSCP) and a specified set of precedence bits.

8. The method of claim 1 wherein the utilizing step comprises utilizing a second protocol different than the first protocol to tag particular packets for transmission at the second priority level.

9. The method of claim 8 wherein the second protocol comprises a Differentiated Services (DiffServ) protocol.

10. The method of claim 9 wherein the tagging mechanism involves including within a Type of Service (TOS) byte in a header of a given packet a specified Differentiated Services Code Point (DSCP).

11. The method of claim 10 wherein the second protocol comprises an IP Precedence protocol.

12. The method of claim 11 wherein the tagging mechanism involves including within a Type of Service (TOS) byte in a header of a given packet a specified set of precedence bits.

13. The method of claim 1 wherein the transmission of packets is commenced at the first priority level in accordance with a real-time transport protocol (RTP).

14. An apparatus for use in establishing packet-based communication between first and second endpoints over a network, the apparatus comprising at least one processing device having a processor coupled to a memory and being operative to perform a setup process for establishing the communication, wherein as part of the setup process:
   a resource is requested from the network utilizing a first protocol;
   while the request is pending, transmission of packets at a first priority level is commenced, wherein the first priority level is higher than a priority level of Best Effort (BE) traffic in the network; and
   after a response is received from the network granting access to the requested resource, a tagging mechanism is utilized to identify particular packets for transmission at a second priority level higher than the first priority level;
   wherein the first priority level is implemented for a first one of the packets by setting a designated portion of a header of the first packet to a value specifying a Better than Best Effort (BBE) policy; and
   wherein the second priority level is implemented for a second one of the packets by setting the designated portion of a header of the second packet to a value specifying an Expedited Forwarding (EF) policy;
   transition between use of the BBE policy and use of the EF policy thereby being conditioned on success or failure of the request for the resource, with a transition from use of the BBE policy to use of the EF policy occurring if the request is granted, and the policy in use otherwise remaining the BBE policy.

15. The apparatus of claim 14 wherein the at least one processing device comprises a router of the network.

16. The apparatus of claim 14 wherein the at least one processing device comprises a processing device implemented in one of the first and second endpoints.

17. A machine-readable storage medium having embodied therein one or more software programs for use in establishing packet-based communication between first and second endpoints over a network, the one or more software programs being operative to perform a setup process for establishing the communication, wherein as part of the setup process:
   a resource is requested from the network utilizing a first protocol;
   while the request is pending, transmission of packets at a first priority level is commenced, wherein the first priority level is higher than a priority level of Best Effort (BE) traffic in the network; and after a response is received from the network granting access to the requested resource, a tagging mechanism is utilized to identify particular packets for transmission at a second priority level higher than the first priority level;

wherein the first priority level is implemented for a first one of the packets by setting a designated portion of a header of the first packet to a value specifying a Better than Best Effort (BBE) policy; and wherein the second priority level is implemented for a second one of the packets by setting the designated portion of a header of the second packet to a value specifying an Expedited Forwarding (EF) policy;

transition between use of the BBE policy and use of the EF policy thereby being conditioned on success or failure of the request for the resource, with a transition from use of the BBE policy to use of the EF policy occurring if the request is granted, and the policy in use otherwise remaining the BBE policy.

* * * * *